United States Patent
Kajiura et al.

(10) Patent No.: US 6,783,894 B2
(45) Date of Patent: Aug. 31, 2004

(54) NON-AQUEOUS ELECTROLYTE SECONDARY BATTERY

(75) Inventors: Yoshio Kajiura, Wakayama (JP); Tetsuya Kusakabe, Wakayama (JP); Nobuyuki Isshiki, Wakayama (JP)

(73) Assignee: Kao Corporation, Tokyo (JP)

( * ) Notice: Subject to any disclaimer, the term of this patent is extended or adjusted under 35 U.S.C. 154(b) by 6 days.

(21) Appl. No.: 09/822,220

(22) Filed: Apr. 2, 2001

(65) Prior Publication Data

US 2001/0019798 A1 Sep. 6, 2001

Related U.S. Application Data

(62) Division of application No. 09/125,452, filed on Aug. 19, 1998, now Pat. No. 6,287,728.

(30) Foreign Application Priority Data

Dec. 24, 1996 (JP) .......................................... P 08-343166

(51) Int. Cl.⁷ ............................................... H01M 4/04
(52) U.S. Cl. ...................................... 429/231.1; 264/44
(58) Field of Search .......................... 429/231.1–231.4; 29/623.4; 264/41, 44, 413

(56) References Cited

U.S. PATENT DOCUMENTS 5,538,814 A * 7/1996 Kamauchi et al.

FOREIGN PATENT DOCUMENTS

| EP | 0 709 906 A1 | * 5/1996 |
| JP | 5-299090 | 11/1993 |
| JP | 8-180904 | 7/1996 |

* cited by examiner

*Primary Examiner*—Susy Tsang-Foster
(74) *Attorney, Agent, or Firm*—Birch, Stewart, Kolasch & Birch, LLP

(57) ABSTRACT

A process for producing a porous sintered positive electrode for a secondary battery. The steps include:

(a) calcining a raw material containing a lithium compound under an oxidizing atmosphere to form calcined powders;
(b) mixing the calcined powders with organic fibers or organic polymer particles to form a raw mixture;
(c) forming the raw mixture into a raw electrode; and
(d) heating the raw electrode to remove any organic fibers or any organic polymer particles.

3 Claims, 2 Drawing Sheets

NON-AQUEOUS ELECTROLYTE SECONDARY BATTERY

This application is a divisional of application Ser. No. 09/125,452, filed Aug. 19, 1996, now U.S. Pat. No. 6,287,728 B1, the entire contents of which are hereby incorporated by reference and for which priority is claimed under 35 U.S.C. §120. application Ser. No. 09/125,452 is the national phase under 35 U.S.C. §371 of prior PCT International Application No. PCT/JP97/04709 filed on Dec. 19, 1997, which designated the United States of America, and claimed foreign priority of Application No. 8-343166 filed in Japan on Dec. 24, 1996.

TECHNICAL FIELD

The present invention relates to a non-aqueous electrolyte secondary battery using a porous material comprising an active material as an electrode material.

BACKGROUND ART

Positive and negative electrodes of a non-aqueous electrolyte battery, particularly lithium secondary battery, are produced by mixing a powdered active material, a conductive material and a polymer binder, dissolving the mixture in a solvent to form a coating composition, applying the coating composition on a metal foil, drying the coating composition and forming the coated metal foil into a predetermined shape. The proportion of the active material in this electrode is about 40% by volume. The remainder of the electrode is composed of 20 to 30% by volume of binding material, conductive materials, metal foils or the like and 30 to 40% by volume of pores. Accordingly, an electric capacity per unit volume is limited by those, which do not substantially contribute to the capacity of the electrode, such as binding material, conductive materials, metal foils and the like. The metal foil occupies the major portion of the weight of the electrode and also limits the electric capacity per unit volume.

Furthermore, manufacturing of a coat requires a lot of steps such as mixing and dispersing of binding material, application of a coating composition, drying of the coat, calender press and the like, and it is complicated. On the other hand, the electrode material must satisfy required performances peculiar to the coating composition, such as shape of particles and the like. Also, performances, which are not substantially necessary to the electrode material, are required, resulting in increase of the cost.

In a lot of commercially available products, a pair of positive and negative electrodes has a ribbon-like shape, and is placed in a container after winding and crushed into a flattened shape and then the container is sealed. According to this method, the corner portion has poor packing in case of packing in a rectangular container so that the electric capacity per unit volume is further lowered.

DISCLOSURE OF THE INVENTION

Hence, an object of the present invention is to provide a non-aqueous solvent secondary battery, which can reduce the volume of a dead space in an electrode contained in a container of the constituted battery, thereby to increase an electric capacity per unit volume, by using a porous material comprising substantially only an active material as an electrode material.

The another object of the present invention is to provide a non-aqueous solvent secondary battery, which can sufficiently bring an active material into contact with an electrolyte solution, electrically, and can reduce the amount of a metal foil as a current collecting material and a conductive material or make use of them unnecessary, and can increase an electric capacity per unit weight in comparison with the prior art, by using the porous material as the electrode material, rather a powder material.

BEST MODE FOR CARRYING OUT THE INVENTION

Figure 1:
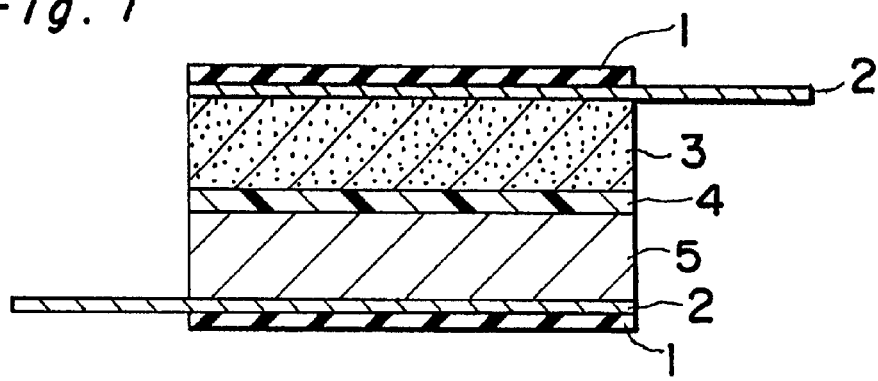
FIG. 1 is a schematic diagram of a unit cell wherein a positive electrode of a porous sintered material and a negative electrode of a porous sintered material are laminated through a separator.

In FIG. 1, a basic form of a unit cell of the present invention is shown, the unit cell being formed by laminating a positive electrode 5 of a porous sintered material and a negative electrode 3 of a porous sintered material through a separator 4, bonding each collecting tab 2 on upper and lower end surfaces and covering with an insulating material film 1.

The above positive electrode 5 of the porous sintered material can be made optionally in a suitable size according to usage, and the thickness is from 10 $\mu$m to 2 mm, and preferably from 50 $\mu$m to 1 mm. When the electrode is in the form of a plate, the thickness must be adjusted to not more than 2 mm. When the thickness is not less than 2 mm, the resistance of ions flowing in a publicly known non-aqueous electrolyte solution becomes too large in view of practical use and the internal resistance becomes large. Therefore, a potential loss due to the non-aqueous electrolyte solution exceeds 0.1 V relative to a current of 1 A. Paying attention to portable usage, the thickness is preferably not less than 50 $\mu$m to dynamically protect a structure from vibration and impact. In case of laminating, since the proportion of the volume occupied by a separator increases when the number of layers is increased, the thickness is preferably about 0.5 mm.

As the material for positive electrode, there can be used any material which has been publicly known heretofore, and examples thereof include $Li_xCoO_2$, $Li_xNiO_2$, $MnO_2$, $Li_xMnO_2$, $LiMn_2O_4$, $Li_xCo_yMn_{2-y}O_4$, $\alpha$-$V_2O_5$, $TiS_2$ and the like. Particularly, a substance containing $LiCoO_2$, $LiNiO_2$, $LiMnO_4$ or a lithium transition metal oxide as a main component is preferred.

It is preferred that this plate-shaped porous sintered material contains pores of an average diameter of 0.01 to 100 $\mu$m, preferably from 0.1 to 50 $\mu$m, and particularly from 0.1 to 10 $\mu$m, in the proportion of 15 to 60%, and normally from 25 to 50%, based on the total volume. Because the proportion of the pores must be not more than 60% in a volume proportion in order to increase the amount of the electrode material in the electrode in comparison with the case where the electrode is formed by using a conventional powder material. Since the electrolyte solution must be penetrated into the electrode, the proportion of the pores is preferably not less than 15%. When the diameter of the pores is not more than 0.01 μm, the electrolyte solution does not easily penetrate and it is not suitable for practical use. Since ions flow in the electrolyte solution in the form of solvation, the diameter is preferably large such that the resistance does not become too large even if the current density becomes comparatively large. The maximum diameter must be not more than 100 μm so as to protect the entire structure by this wall thickness and the proportion of the holes is adjusted to not more than 60% based on the whole volume. The term "porosity (proportion of the pores)" used herein means an open porosity and was measured by the Archimedes' method. The average diameter was measured by the mercury penetration method.

Archimedes' Method

The porosity can be obtained by the following equation:

Porosity=apparent porosity (open porosity)=open pore volume/ external form volume $$=(W_3-W_1)/(W_3-W_2) \times 100$$

where $W_1$ denotes an original weight of a sample, $W_2$ denotes a weight obtained by measuring in water after evacuating or boiling in water to expel air in pores and cooling the sample, and $W_3$ denotes a weight obtained by measuring after taking out the sample from water and wiping only the surface to remove water drops.

Mercury Penetration Method

Using a mercury porositor, Pore Sizer 9320 manufactured by Shimadz Seisakusho Co., Ltd., the measurement was performed at normal temperature (25° C.). That is, using a 15 ml cell for solid, the average diameter of the calcined sample was measured at the low pressure measuring portion from 0 to 14.5 psi (0 to 0.1 MPa) and at the high pressure measuring portion from 14.5 to 30,000 psi (0.1 to 207 MPa) by the pressure/penetration amount variable speed pressure method.

Regarding the size of the pore diameter, a median diameter on the volume basis determined under the conditions of a contact angle of mercury of 130°, a surface tension of 484 dynes/cm and a density of 13.5462 g/ml was taken as the pore diameter size.

The wall thickness between pores is adjusted to not more than 40 μm. Regarding the wall thickness between pores of the porous material, an efficient value is decided by diffusion of ions. In order to meet the demand of use in a portable telephone capable of charging over 3 hours and discharging over 1 to 2 hours, the performances of the electrode material can not be sufficiently utilized unless the distance of diffusion is not more than 20 μm. That is, the wall thickness is preferably adjusted to the value (not less than 40 μm) two times as large as the diffusion distance.

The calcined material as the positive electrode obtained directly from the raw material of the positive electrode has low density as it is. Regarding penetration of the electrolyte solution, pores are merely present insufficiently. Accordingly, an electrode material having sufficiently high density can be obtained by temporarily calcining powders of a raw material containing lithium carbonate, cobalt carbonate, etc. to form powders, which are partially unreacted, followed by forming and further normal calcination under an oxidizing atmosphere. The method of forming pores includes a method of merely forming powders and heat-treating the formed article. However, in order to prevent the inhibition of flow of ions to sufficient penetration of electrolyte solution, when organic fibers (those having a diameter of about 0.1 to 100 μm) of wool, cotton, silk, nylon, acrylic, acetate, polyester and the like or organic polymer particles (those having a diameter of about 0.1 to 100 μm) of nylon, PMMA (polymethyl methacrylate) and the like are incorporated into the temporarily calcined powders and the organic fibers are evaporated by normal calcination to effectively form a route through which ions pass, a voltage drop can be more reduced to a large current.

By the same reason, the above negative electrode 3 is composed of a porous sintered material which is plate-shaped and has a thickness of 100 μm to 2 mm, and the porous sintered material contains pores of an average diameter of 0.1 to 100 μm, preferably from 0.1 to 50 μm, and particularly from 0.1 to 10 μm, in the proportion of 15 to 60%, and preferably from 25 to 50%, based on the total volume, and an average wall thickness between the pores is not more than 40 μm. Examples of the material for negative electrode used in the present invention include publicly known electrode materials such as carbon material, oxide of Groups IIIb–Vb, metallic aluminum, silicon, silicon compound and the like. As the carbon material, there can be used carbon material such as natural graphite, coke, glassy carbon graphite precursor or the like. Particularly, a carbon material obtained by calcining a raw material, which is carbonized by a heat treatment, is preferred. The material, which is carbonized by a heat treatment, is not specifically limited, and specific examples thereof include thermosetting resins such as phenol resin, epoxy resin, unsaturated polyester resin, furan resin, urea resin, melamine resin, alkyd resin, xylene resin or the like; condensed polycyclic hydrocarbon compound such as naphthalene, acenaphthylene, phenanthrene, anthracene, triphenylene, pyrene, chrysene, naphthacene, picene, perylene, pentaphene, pentacene or the like, or a derivative thereof; or a pitch containing a mixture of them as a main component. Particularly preferred aspect is a plate-shaped negative electrode material comprising substantially 30 to 90% by weight of silicon and 10 to 70% by weight of carbon, which is obtained by mixing silicon or a compound thereof with a carbon material or a carbonized material obtained by calcination of the carbon material, and calcining the mixture under a non-oxidizing atmosphere at 600 to 1500° C. When organic fibers (those having a diameter of about 0.1 to 100 μm) of wool, cotton, silk, nylon, acrylic, acetate, polyester and the like or organic polymer particles (those having a diameter of about 0.1 to 100 μm) of nylon, PMMA (polymethyl methacrylate) and the like are incorporated into the temporarily calcined powders and the organic fibers are evaporated by normal calcination to effectively form a route through which ions pass, a voltage drop can be more reduced to a large current. In this case, the organic fibers or polymers to be used are preferably those, which are vaporized under a non-oxidizing atmosphere at high temperature. The carbon material is preferably carbonized at the calcination temperature of not less than 800° C., and preferably from 1200 to 3000° C. In this carbonization step, thermosetting fibers are decomposed and evaporated to form communicating pores, whereas the thermosetting resin is cured and carbonized while maintaining its form. When the carbonization temperature is lower than 800° C., components other than carbon remain and those having an electric conductivity of higher than $5 \times 10^{-3}$ S/cm cannot be obtained.

When the carbonization temperature is not less than 1200° C., since not only hydrogen but also oxygen can be removed, a carbon mass having high electric conductivity can be obtained. A carbon thin plate can be obtained by cutting the resulting carbon mass, for example, a carbon bar into pieces having a desired thickness in the direction, which is nearly perpendicular to the formed pores.

The carbon thin plate may also be produced by using a substance, which is soluble in an acid, e.g. metal fibers in place of the organic fibers, curing the thermosetting resin in the same manner as that described above, cutting into pieces having a desired thickness and eluting the metal fibers with an acid. A carbon thin plate having curved communicating pores can be obtained by kneading the thermosetting resin with an inorganic salt such as sodium carbonate in place of the metal fibers, carbonizing the mixture, followed by cutting and elution with an acid. The communicating pores may be formed by laser radiation, electron radiation, synchrotron radiation or the like.

The above separator 4 may be any known one such as thin polyethylene micro-porous film, polypropylene micro-porous film or polypropylene non-woven fabric having a thickness of not more than 200 $\mu$m, and preferably not more than 50 $\mu$m.

The non-aqueous electrolyte solution used in the present invention is prepared by appropriately using an organic solvent in combination with an electrolyte, but these organic solvent and electrolyte may be any one used in this kind of a battery.

Examples of the organic solvent include propylene carbonate, ethylene carbonate, vinylene carbonate, dimethyl carbonate, diethyl carbonate, methylethyl carbonate, 1,2-dimethoxyethane, 1,2-dimethoxyethane methylformate, butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, butyronitrile, valeronitrile, benzonitrile, 1,2-dichloroethane, 4-methyl-2-pentanone, 1,4-dioxane, anisole, diglyme ($CH_3OCH_2CH_2)_2O$, dimethylformamide, diemthyl sulfoxide and the like.

It is more preferred to use the above chain carbonate and cyclic carbonate in combination in comparison with the case where they are used alone respectively. The mixing ratio of the former is preferably from 1 to 99% by volume, and more preferably from 20 to 80% by volume.

Examples of the electrolyte include $LiClO_4$, $LiAsF_6$, $LiBF_4$, $LiB(C_6H_5)_4$, $LiCl$, $LiPF_6$, $LiBr$, $LiI$, $CH_3SO_3Li$, $CF_3SO_3Li$, $LiAlCl_4$ and the like. These electrolytes can be used alone or in combination thereof.

Figure 2:
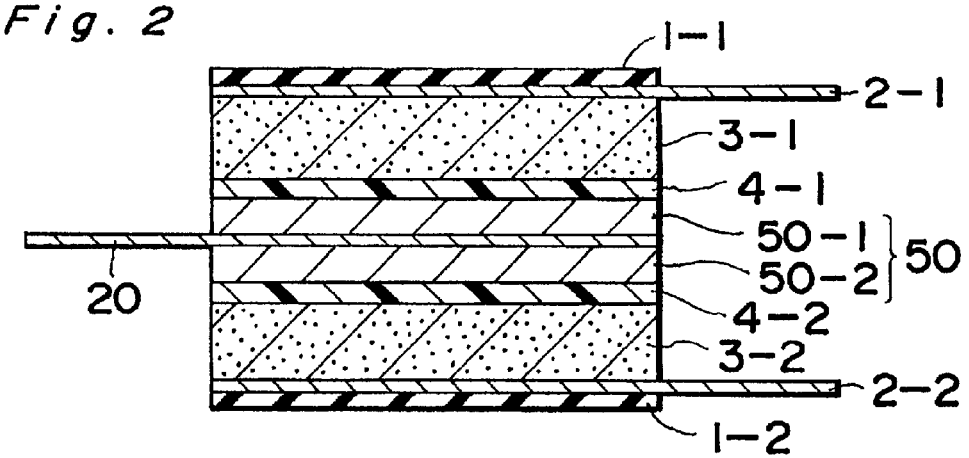
FIG. 2 is a schematic diagram of a first sandwich type cell wherein a positive electrode of a porous sintered material is formed on both sides of a current collecting tab and a unit cell is formed on both sides thereof.

FIG. 2 shows a first sandwich type cell wherein using, as a center, a composite positive electrode plate 50 obtained by forming positive electrode plates 50-1, 50-2 of the porous sintered material on both sides of a current collecting tab 20, a negative electrode plate 3-1 of the porous sintered material, an upper current collecting tab 2-1 and an upper insulating material film 1—1 are laminated on an upper positive electrode plate 50-1 through a separator 4-1, thereby to form an upper unit cell, whereas a negative electrode plate 3-2 of the porous sintered material, a lower current collecting tab 2—2 and a lower insulating material film 1-2 are laminated on a lower positive electrode plate 50-2 through a separator 4-2, thereby to form a lower unit cell. Since the cell shown in FIG. 2 is the same as that shown in FIG. 1 except for the structure of the positive electrode plate, the description is omitted. Each positive electrode plate has a structure of sandwiching the current collecting tab 20 between plate materials having a thickness which is half as large as that of the negative electrode plate.

Figure 3:
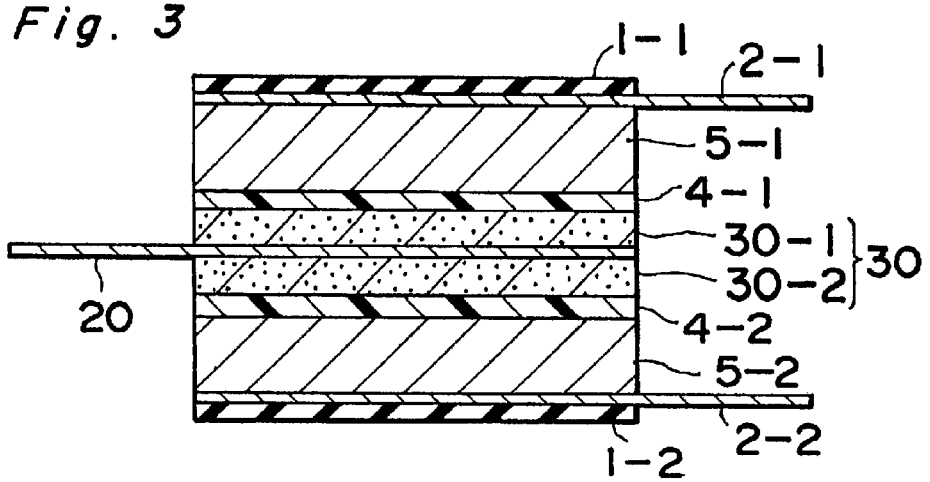
FIG. 3 is a schematic diagram of a second sandwich type cell wherein a negative electrode of a porous sintered material is formed on both sides of a current collecting tab and a unit cell is formed on both sides thereof.

FIG. 3 shows a second sandwich type cell wherein using, as a center, a composite negative electrode plate 30 obtained by forming negative electrode plates 30-1, 30-2 of the porous sintered material on both sides of a current collecting tab 20, a positive electrode plate 5-1 of the porous sintered material, an upper current collecting tab 2-1 and an upper insulating material film 1—1 are laminated on an upper negative electrode plate 30-1 through a separator 4-1, thereby to form an upper unit cell, whereas a positive electrode plate 5-2 of the porous sintered material, a lower current collecting tab 2—2 and a lower insulating material film 1-2 are laminated on a lower negative electrode plate 30-2 through a separator 4-2, thereby to form a lower unit cell. Since the cell shown FIG. 3 is the same as that shown in FIG. 1 except for the structure of the negative electrode plate, the description is omitted. Each negative electrode plate has a structure of sandwiching the current collecting tab 20 between plate materials having a thickness which is half as large as that of the positive electrode plate.

Figure 4:
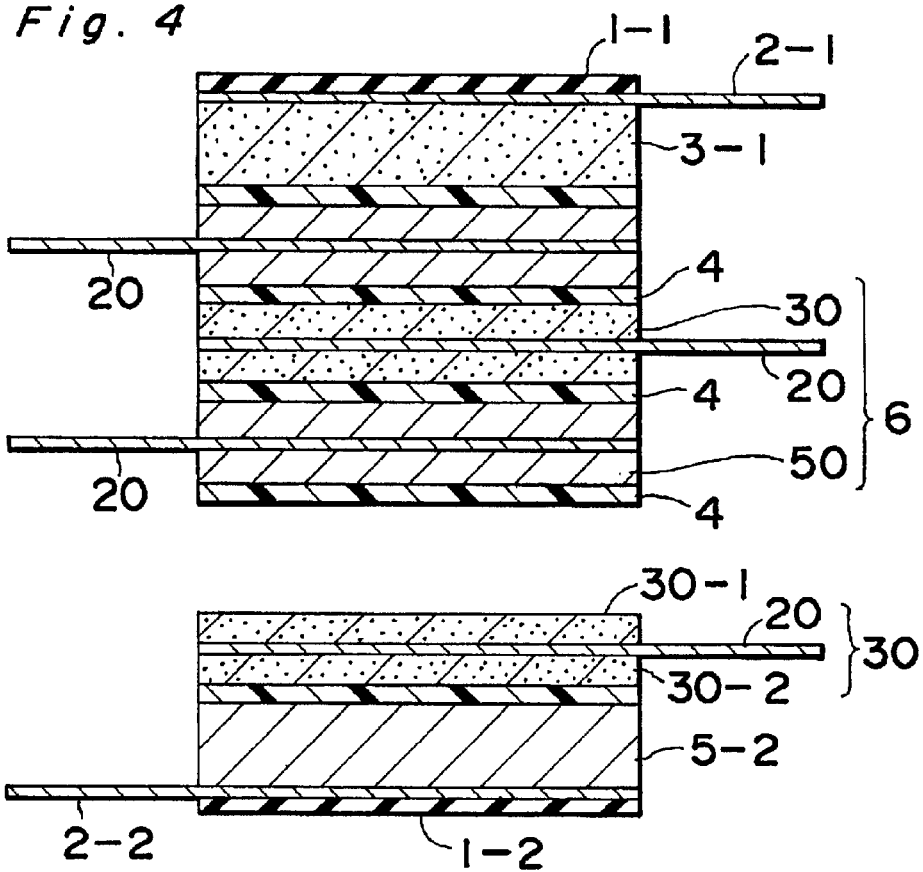
FIG. 4 is a schematic diagram of a multi-layer type cell wherein a positive electrode of a porous sintered material formed on both sides of a current collecting tab and a negative electrode of a porous sintered material formed on both sides of a current collecting tab are laminated.

FIG. 4 shows a multi-layer type cell constituted by repeating a battery unit 6, obtained by laminating a complex positive electrode plate 50 equipped with a porous sintered material formed on both sides of the above current collecting tab and a negative electrode plate equipped with a porous sintered material formed on both sides of the current collecting tab through a separator 4, laminating a negative electrode plate 3-1, an upper current collecting tab 2-1 and an upper insulating material film 1—1 are laminated on the upper side, and then laminating a positive electrode plate 5-2 of the porous sintered material, a lower current collecting tab 2—2 and a lower insulating material film 1-2. Since the respective constituent elements are the same as those shown in FIG. 1 to FIG. 3, the detailed description is omitted.

PRODUCTION EXAMPLE 1

(Production of Positive Electrode)

A lithium carbonate powder and a cobalt carbonate powder were weighed and mixed so as to be in a molar ratio (Li:Co) of 1:1, and the mixture was temporarily calcined in an atmospheric environment at 600° C. for 1 hour. After grinding, acrylic fibers of a diameter of 20 $\mu$m and a length of 50 $\mu$m were mixed and the mixture was pressurized. Then, the resulting pressurized article was heat-treated in an atmospheric environment at 800° C. for 10 hours and polished to obtain a positive electrode of a diameter of 15 mm, a thickness of 0.4 mm, a density of 3.0 g/cm$^3$ and a porosity of 40.

PRODUCTION EXAMPLE 2

(Production of Positive Electrode)

A lithium carbonate powder and a cobalt carbonate powder were weighed and mixed so as to be in a molar ratio (Li:Co) of 1:1, and the mixture was temporarily calcined in an atmospheric environment at 800° C. for 1 hour. After grinding, spherical PMMA particles of an average particle diameter of 5 $\mu$m were mixed and the mixture was pressurized. Then, the resulting pressurized article was heat-treated in an atmospheric environment at 900° C. for 10 hours and polished to obtain a positive electrode of a diameter of 15 mm, a thickness of 0.6 mm, a density of 3.1 g/cm$^3$ and a porosity of 38%.

PRODUCTION EXAMPLE 3

(Production of Negative Electrode)

Seven hundred thousand polyester fibers of a size of 20 $\mu$m were contained in a cylindrical container of an inner diameter of 18 mm and a thermosetting resin, specifically a composition comprising 100 parts by weight of furfuryl alcohol, 46 parts by weight of paraformaldehyde and 134 parts by weight of phenol, was charged to fill the space in the container, thereby impregnating the fibers. After the resin is cured by placing in a dryer at 80° C. for 72 hours, the resulting bar-like cured article was cut into pieces in the form of a disc having a thickness of 0.5 mm by using a diamond cutter. Then, the disc was heat-treated under an inert atmosphere at 2200° C. for 3 hours to carbonize the cured resin and to decompose and vaporize the impregnated fibers, thereby obtaining a carbon thin plate of a diameter of 15 mm, a thickness of 0.4 mm, a weight of 0.05 g and a porosity of 36%. This carbon thin plate was observed by using a microscope (×200). As a result, the number of communicating pores having an average pore diameter of 20 $\mu$m in 1 mm$^2$ was 2000. A metal plate was laminated on both sides of the carbon thin plate and the electric conductivity in the thickness direction was measured. As a result, it was not less than 1×100 S/cm. This was used as a negative electrode.

PRODUCTION EXAMPLE 4
(Production of Negative Electrode)

80 Parts by weight of a commercially available crystalline silicon powder (manufactured by Kojundo Kagaku Co.) having a purity of 99.9% and an average particle diameter of 1 $\mu$m and 50 parts by weight of pitch carbon (residual carbon content 50%) were mixed and dispersed in isopropyl alcohol by using a vibration mill. After the suspended slurry was allowed to stand at room temperature for 24 hours, isopropyl alcohol was removed by using a vacuum trap and a mixed powder of the silicon powder and pitch carbon was formed. The formed article had a diameter of 15 mm and a thickness of 0.4 mm. At this time, 1% by weight of polyvinyl alcohol was added as a forming aid. Forming was performed under the pressure of 1.3 ton/cm$^2$. The molded article was calcined in a nitrogen atmosphere at 1100° C. at a heating rate of 100° C./hour for 3 hours, and the calcined formed article was used as the negative electrode.

EXAMPLE 1

A polyethylene porous film as a separator was interposed between the positive electrode and negative electrode obtained in Production Examples 1 and 3, and a solution prepared by adding lithium hexafluorophosphate (1 mol/l) to a mixed solvent of ethylene carbonate and dimethyl carbonate in a volume ratio of 1:1 was added as an electrolyte solution to obtain a coin type lithium ion secondary battery. The electric capacity was 18 mAh.

EXAMPLE 2

A metal piece for collecting a current was attached to the positive electrode plate and negative electrode plate obtained in Production Examples 1 and 3, and a polyethylene porous film as a separator was interposed between them to make a battery unit whose positive electrode plate side is upper side. Ten battery units were piled up through a separator, and then one current collecting bundle as a positive electrode and one current collecting bundle as a negative electrode were made by bundling metal pieces for collecting a current, respectively. The negative electrode was lead to the lower most layer and the positive electrode was lead to the upper most layer and the resultant was placed in a metal container. Then, a solution, prepared by adding lithium hexafluorophosphate (1 mol/l) to a mixed solvent of ethylene carbonate and dimethyl carbonate in a volume ratio of 1:1 was added, was used as an electrolyte solution to obtain a coin type lithium ion secondary battery. The electric capacity was 180 mAh.

EXAMPLE 3

The carbon thin plate produced in Production Example 3 was used as the negative electrode, and a disc obtained by charging a part of a mixture comprising 84 parts of lithium cobaltate, 7 parts of a carbon powder, 2 parts of acetylene black and 7 parts of polyvinyl pyrrolidone in a mold and forming under the pressure of 1 ton/cm$^2$ was used as the positive electrode. A polyethylene porous film as a separator was interposed between both electrodes and a solution, prepared by adding lithium hexafluorophosphate (1 mol/l) to a mixed solvent of ethylene carbonate and dimethyl carbonate in a volume ratio of 1:1 was added, was used as an electrolyte solution to obtain a coin type lithium ion secondary battery. The electric capacity was 16 mAh.

COMPARATIVE EXAMPLE 1

A coin battery having the same shape as that described above was constituted with a coated film comprising 90 parts of a carbon powder which gets some heat-treatment as the carbon in Production Example 3 and 10 parts of polyvinylidene difluoride, which has the same shape as that of the carbon thin plate of Production Example 3 and has an average particle diameter of 7 $\mu$m. As a result, the electric capacity was 14 mAh. It is found that the performances are improved according to the present invention.

EXAMPLE 4

A polyethylene porous film as a separator was interposed between the positive electrode and negative electrode obtained in Production Examples 2 and 4, and a solution prepared by adding lithium hexafluorophosphate (1 mol/l) to a mixed solvent of ethylene carbonate and dimethyl carbonate in a volume ratio of 1:1 was added as an electrolyte solution to obtain a coin type lithium ion secondary battery. The electric capacity was 28 mAh.

COMPARATIVE EXAMPLE 2

In case of both positive and negative electrodes, the above calcined product containing no fibers was ground to obtain a powder of lithium cobaltate having a median diameter of about 30 $\mu$m and a powder of carbon having a median diameter of about 30 $\mu$m.

The positive electrode was produced by incorporating 9 parts by weight of acetylene black, 9 parts by weight of a carbon powder and 12 parts by weight of polyvinylidene fluoride into 90 parts by weight of lithium cobaltate, dissolving the mixture in n-methyl-2-pyrrolidone to form a paste, applying the paste on an aluminum foil of a thickness of 20 $\mu$m, drying the paste, passing through the coated aluminum foil to adjust the thickness to 0.4 mm, and punching into pieces of a diameter of 15 $\mu$m. The negative electrode was produced by incorporating 10 parts by weight of polyvinylidene fluoride into 90 parts by weight of a powder of carbon, dissolving the mixture in n-methyl-2-pyrrolidone to form a paste, applying the paste on an copper foil of a thickness of 15 $\mu$m, drying the paste, passing through the coated copper foil to adjust the thickness to 0.4 mm, and punching into pieces of a diameter of 15 $\mu$m. A polyethylene porous film as a separator was interposed between these positive electrode and negative electrode, and a solution prepared by adding lithium hexafluorohosphate (1 mol/l) to a mixed solvent of ethylene carbonate and dimethyl carbonate in a volume ratio of 1:1 was added as an electrolyte solution to obtain a coin type lithium ion secondary battery. The electric capacity was 14 mAh and the priority of the performances of Example 1 is shown.

COMPARATIVE EXAMPLE 3

A lithium carbonate powder and a cobalt carbonate powder were weighed and mixed so as to be in a molar ratio (Li:Co) of 1:1, and the mixture press-molded. Then, the resulting molded article was heat-treated in an atmospheric environment at 900° C. for 3 hours and polished to obtain a positive electrode of a diameter of 15 mm, a thickness of 0.4 mm and a density of 2.5 g/cm$^3$. Then, a co-condensed composition comprising 100 parts by weight of furfuryl alcohol, 46 parts by weight of 92% paraformaldehyde and 134 parts by weight of phenol was charged to fill the space a cylindrical container of an inner diameter of 18 mm in the container. After the resin is cured by placing in a dryer at 80° C. for 72 hours, the resulting bar-like cured article was cut into pieces in the form of a disc of a thickness of 0.5 mm by using a diamond cutter. Then, the disc was heat-treated under an inert atmosphere at 2200° C. for 3 hours to carbonize the cured resin and to decompose and vaporize the impregnated fibers, thereby obtaining a carbon thin plate of a diameter of 15 mm, a thickness of 0.4 mm and a weight of 0.07 g. This carbon thin plate was applied for the negative electrode.

A polyethylene porous film as a separator was interposed between these positive electrode and negative electrode, and a solution prepared by adding lithium hexafluorophosphate (1 mol/l) to a mixed solvent of ethylene carbonate and dimethyl carbonate in a volume ratio of 1:1 was added as an electrolyte solution to obtain a coin type lithium ion secondary battery. This battery could not confirm the operation unless the current is adjusted to not more than 5 μA. In the measurement at such a weak current, the electric capacity was 3 mAh.

COMPARATIVE EXAMPLE 4

A metal piece for collecting a current was attached to the positive electrode plate and negative electrode plate obtained in Comparative Example 2 by a spot welding, and a polyethylene porous film as a separator was interposed between them to make a battery unit whose positive electrode plate side is upper side. Ten battery units were piled up through a separator, and then one current collecting bundle as a positive electrode and one current collecting bundle as a negative electrode were made by bundling metal pieces for collecting a current, respectively. The negative electrode was lead to the lower most layer and the positive electrode was lead to the upper most layer and the resultant was placed in a metal container. Then, a solution, prepared by adding lithium hexafluorophosphate (1 mol/l) to a mixed solvent of ethylene carbonate and dimethyl carbonate in a volume ratio of 1:1 was added, was used as an electrolyte solution to obtain a coin type lithium ion secondary battery. The electric capacity was 140 mAh.

Even under the conditions, which are widely employed in fact, the superiority of the performances of Example 2 was shown.

What is claimed is:

1. A process for producing a positive electrode for a secondary battery, said process comprising:

(a) calcining a raw material containing a lithium compound under an oxidizing atmosphere to produce calcined powders;

(b) forming said calcined powders to a shape of an electrode after incorporating organic fibers or organic polymer particles thereinto; and (c) calcining the formed calcined powders under the oxidizing atmosphere, thereby obtaining a porous sintered positive electrode;

wherein the calcining in step (a) of the raw material is conducted at a temperature lower than the temperature of calcining in step (c) of the formed powders; and wherein the calcining of the raw material in step (a) is conducted for a period of time less than the period of time of calcining in step (c) of the formed powders.

2. A process for producing a positive electrode for a secondary battery, said process comprising:

(a) calcining a raw material containing a lithium compound under an oxidizing atmosphere to produce calcined powders;

(b) forming said calcined powders to a shape of an electrode after incorporating organic fibers or organic polymer particles thereinto; and (c) calcining the formed calcined powders under the oxidizing atmosphere, thereby obtaining a porous sintered positive electrode;

wherein the calcining in step (a) of the raw material is conducted at a temperature lower than the temperature of calcining in step (c) of the formed powders;

wherein the calcining of the raw material in step (a) is conducted for a period of time less than the period of time of calcining in step (c) of the formed powders; and wherein said organic fibers have a cross-sectional diameter of 0.1 to 100 μm and said organic polymer particles have a diameter of 0.1 to 100 μm.

3. A process for producing a porous sintered positive electrode for a secondary battery, said process comprising:

(a) calcining a raw material containing a lithium compound under an oxidizing atmosphere to produce calcined powders;

(b) mixing the calcined powders with a removable material selected from the group consisting of organic fibers and organic polymer particles to form a raw mixture;

(c) forming said raw mixture into a raw electrode; and (d) heating said raw electrode to remove the removable material, thereby converting said raw electrode into a porous sintered positive electrode;

wherein the calcining in step (a) of the raw material is conducted at a temperature lower than the temperature of calcining in step (d) of the formed powders; and wherein the calcining of the raw material in step (a) is conducted for a period of time less than the period of time of calcining in step (d) of the formed powders.

* * * * *